(No Model.)
J. R. McCORD.
SEED PLANTER AND FERTILIZER DISTRIBUTER.
No. 493,872. Patented Mar. 21, 1893.
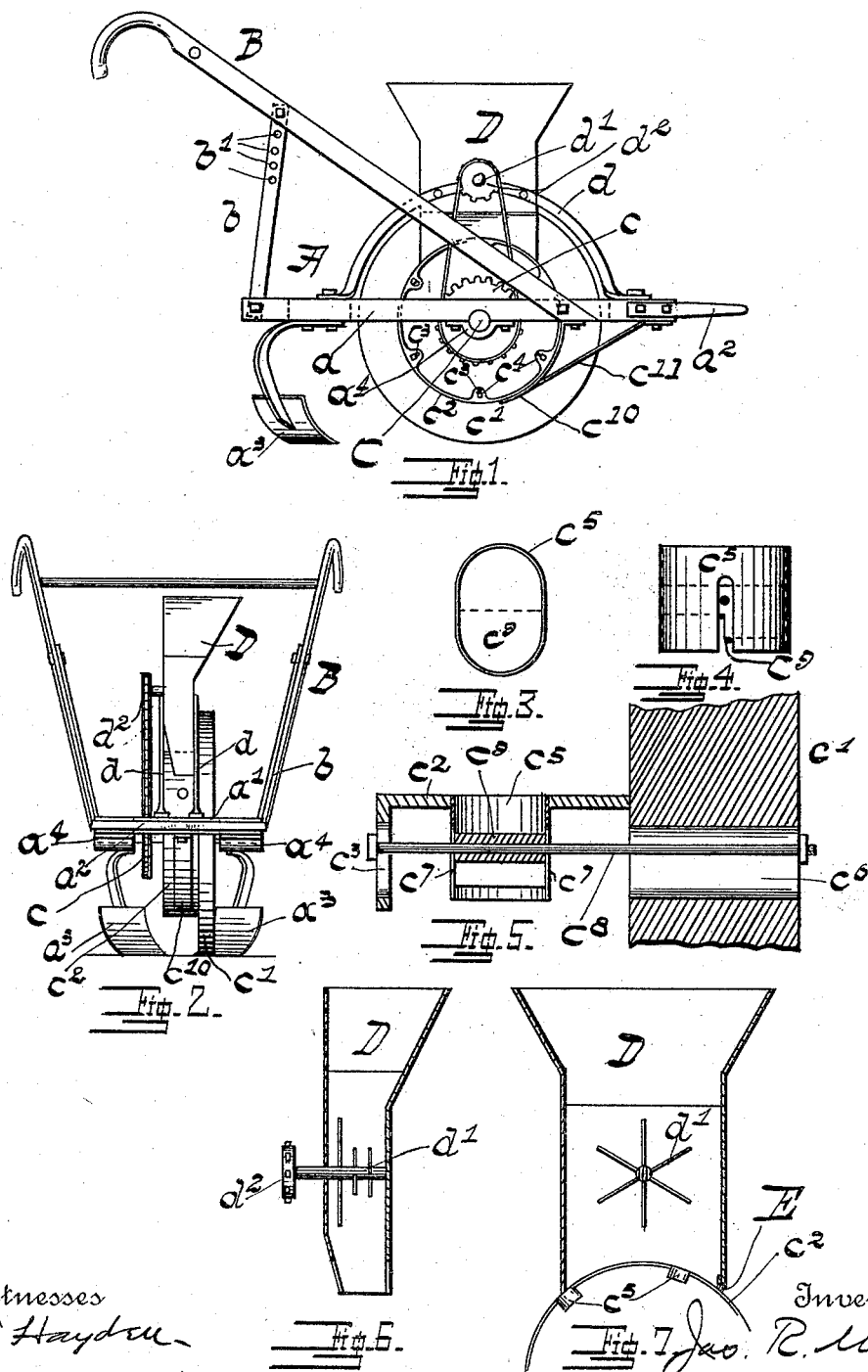

UNITED STATES PATENT OFFICE.

JAMES R. McCORD, OF JACKSON, GEORGIA.

SEED-PLANTER AND FERTILIZER-DISTRIBUTER.

SPECIFICATION forming part of Letters Patent No. 493,872, dated March 21, 1893.

Application filed June 13, 1892. Serial No. 436,576. (No model.)

*To all whom it may concern:*

Be it known that I, JAMES R. McCORD, a citizen of the United States of America, and a resident of Jackson, in the county of Butts and State of Georgia, have made certain new and useful Improvements in Seed-Planters and Fertilizer-Distributers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates as above stated to the class of farm implements in which the function is to plant seeds, the device produced however being also capable of use in the distribution of fertilizers, the object being general desirability, cheapness and ease of adjustment, the details of construction whereby all of these ends are accomplished being hereinafter fully specified.

In the accompanying drawings, Figure 1 is a side elevation of the device. Fig. 2 is a front view thereof further showing the details of construction. Fig. 3 is a detail of the seed and fertilizer cup. Fig. 4 is a detail thereof in side elevation. Fig. 5 is a section radially of a portion of the wheel showing the mode and means of and for adjustment of the capacity of the said cups. Fig. 6 is a detail in vertical cross-section of the hopper, showing the form thereof and the agitator therein. Fig. 7 is a detail view in longitudinal vertical section of the hopper and a portion of the delivery wheel showing the relative arrangement thereof and further showing the construction thereof.

In the figures, like reference characters are employed in the designation of corresponding elements of construction in all the views.

A is the frame which is composed of parallel side-pieces $a$ and end pieces $a'$, a loop of metal $a^2$ forming the means for the attachment of the draft device and coverers $a^3$ being suitably secured to the back ends of the side pieces $a$. Handles B are pivotally secured to the front ends of the side-pieces $a$ and braces $b$ having several holes $b'$ for adjustment vertically of the handles, brace said handles in their positions being at their other ends secured to the back ends of the side pieces $a$.

A shaft C is journaled in bearing-boxes $a^4$ on the under side of the frame A, and carries near one end, preferably a sprocket wheel $c$ for the purpose of driving the agitator as will be presently described. Near the other end of the said shaft is the driver wheel $c'$, which is of considerable size to allow it to bear upon the ground when the device is in use and said wheel being tight on the shaft C the said shaft will be thereby caused to revolve. On the side of the wheel $c$ is secured by screws or otherwise as desired a ring $c^2$ which has on its opposite edge inwardly projecting and radially slotted ears $c^4$. The wheel $c'$ is also slotted at $c^3$ to correspond with the said slots in the ears $c^4$ as best shown in Fig. 1. In the periphery of the said ring $c^2$ are cut as many holes as required and to the inner side of the said ring around the said holes are attached tubes $c^5$ of the desired form in cross section and of the requisite length. These tubes are open at both ends, the lower half thereof, that is, the end farthest from the ring is slotted at $c^7$ for a considerable distance as best shown in Fig. 4. The slots $c^6$ in the wheel $c$, $c^3$ in the ears $c^4$ and $c^7$ in the tubes $c^5$ are so arranged in sets as to be in line and a rod $c^8$ is passed through all of said slots being adjustable therein as shown in Figs. 3, 4 and 5, and on said rod is secured a block $c^9$ which is of the same form as the interior of and fits within the tube $c^5$, and as the rod $c^8$ is moved in its slots said block is adjusted within the tubes and the capacity thereof thereby changed, for the purpose as will be hereinafter specified. The block $c^9$ is too large in area to allow the capacity of the tube to be adjusted sufficiently small for some fertilizers or seeds without making too small a depth of cavity therein therefor and in order to avoid this difficulty the lower end of the said block, which end may be reversed so as to form the bottom of said cavity, is cut half away, by means of which the cavity is increased in proportional depth. A shoe $c^{10}$ is bolted to the frame and projects downwardly and curves backwardly so as to cover the front lower fourth of the feeding wheel $c'$ and prevent the premature discharge of fertilizer or seed therefrom, said shoe being held in place by a brace $c^{11}$ secured to the forward cross-piece $a'$ and bolted to the lower end of the shoe. If desired the bolt-holes in the shoe and in said brace may be slightly slotted which will allow of a small adjustment whereby the said shoe may at all times be kept in close proximity to the feeding wheels $c'$.

Carried on the arch-bars $d$ secured to the side pieces of the frame is a hopper D, which is of the form shown in Figs. 6 and 7, preferably, and rests over the upper half of the wheel $c'$ its lower opening being such that it will deposit fertilizers or seeds in the cups $c^5$, whence they will be by the revolution of the wheel deposited upon the ground. The agitator $d'$ is revolved in the said hopper by a sprocket wheel $d^2$ thereon and a chain-belt connection with the wheel $c$ on the shaft C. A brush E prevents egress of seeds at that point.

The operation of this device is as follows: The proper adjustment is made by moving the blocks in the tubes as specified, the hopper filled with the material either seeds or fertilizer, which it is desired to distribute and the device started forward, whereupon the seeds will be by gravity filled into the cups $c^5$, the brush E removing the surplus and preventing the egress of any material which might adhere to the periphery of the wheel. The shoe $c^{10}$ prevents the premature discharge of seed, guiding them to a position directly under the shaft C, at which point they will by gravity fall to the ground, and be covered by the coverers $a^3$.

Having thus described my invention, what I claim as new, and desire to secure by Letters Patent of the United States, is—

In a seed-planter and fertilizer distributer, a frame and a hopper carried thereon, provided with a semicylindrically concaved open bottom, and the wheel $c'$ journaled on said frame, and a ring carried on the side of said wheel in contact peripherally with said open bottom and having apertures through it, flanges projecting inwardly from around said apertures, and a block seated movably within each aperture formed by the said flanges, said block being reversible and having a portion removed from one of its faces and means for holding said block in any set position in its seat, substantially as and for the purpose specified.

In testimony whereof I hereunto affix my signature in presence of two witnesses.

JAMES R. McCORD.

Witnesses:
J. R. SAMS,
J. W. CRUM.